United States Patent

Gulla

[11] 3,947,143
[45] Mar. 30, 1976

[54] PRINTED CIRCUIT DRILL
[75] Inventor: Michael Gulla, Sherborn, Mass.
[73] Assignee: Shipley Company, Inc., Newton, Mass.
[22] Filed: July 15, 1974
[21] Appl. No.: 488,275

[52] U.S. Cl. ............................... 408/230; 408/226
[51] Int. Cl.² ..................................... B23B 51/02
[58] Field of Search ........... 408/224, 226, 230, 199, 408/223, 225

[56] References Cited
UNITED STATES PATENTS
| | | | |
|---|---|---|---|
| 3,058,199 | 10/1962 | Cave et al. ...................... | 408/230 X |
| 3,667,857 | 6/1972 | Shaner et al. ...................... | 408/230 |
| 3,778,180 | 12/1973 | Ostrom ............................. | 408/226 |

Primary Examiner—Gil Weidenfeld
Attorney, Agent, or Firm—Robert T. Gammons

[57] ABSTRACT

A twist drill comprising a bit containing spirally arranged grooves and lands of substantially equal width, with a shank at one end and a pointed tip at the other, the leading edges of the grooves being inclined to the axis of the bit and constituting cutting edges and the lands rearwardly of the cutting edges being relieved, characterized in that there are auxiliary rectilinearly arranged axially spaced cutting edges parallel to the axis of the bit formed by straight line channels spaced peripherally about the axis of the bit but of lesser depth than the spirally arranged grooves.

8 Claims, 6 Drawing Figures

U.S. Patent  March 30, 1976  3,947,143
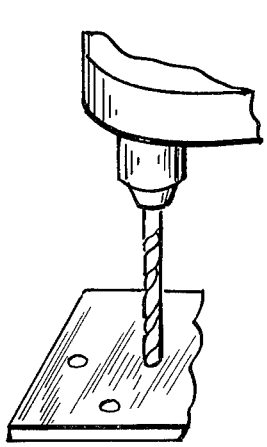
FIG.1
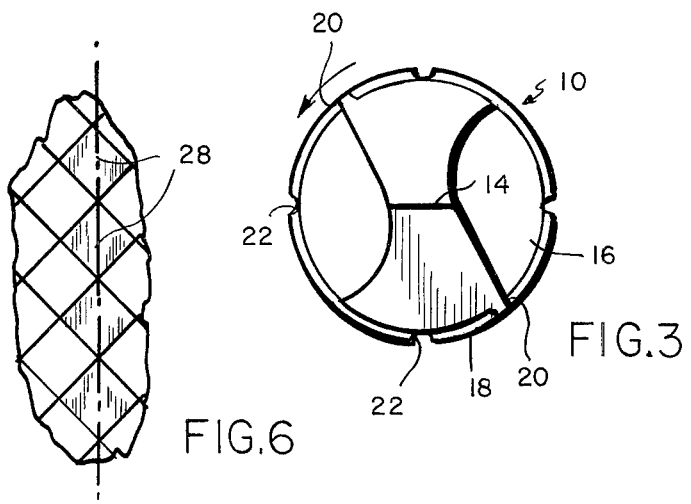
FIG.6
FIG.3
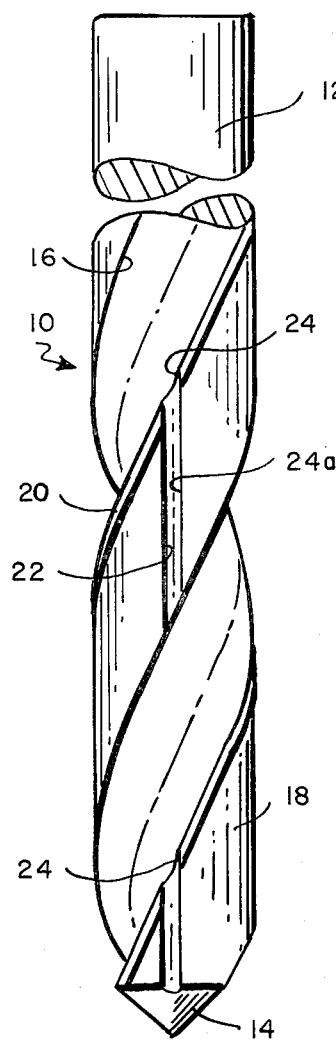
FIG.2
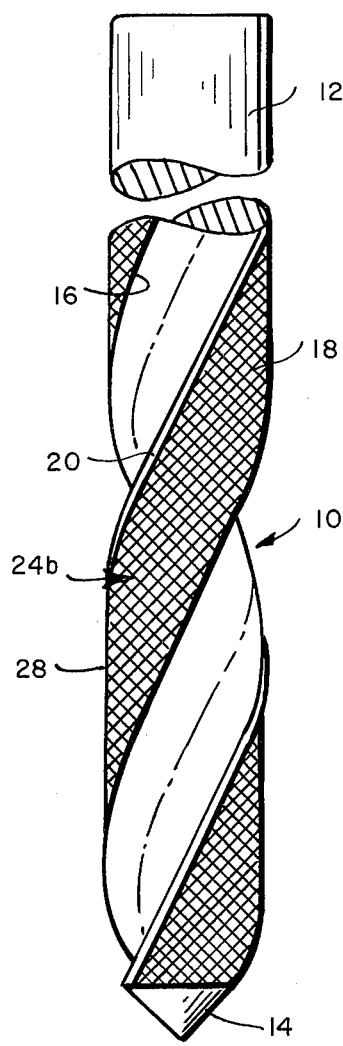
FIG.4
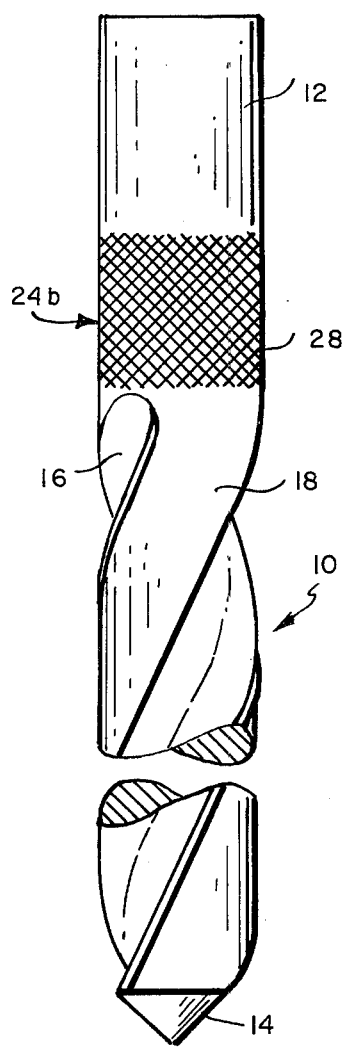
FIG.5

PRINTED CIRCUIT DRILL

BACKGROUND OF INVENTION

In the patent to Ostrom, U.S. Pat. No. 3,778,180 there is shown a specially designed drill bit for use in drilling holes in printed circuit boards wherein the spirally arranged grooves extend from the bit into the shank to facilitate rejection of the drilled material, shavings and the like which tend to cling to the shoulders. In the patent to Shaner, U.S. Pat. No. 3,667,857, there is disclosed a drill bit provided with conventional helical grooves and between these grooves additional helical grooves of lesser depth provided with notched leading edges which supplement those of the conventional grooves. The discontinuity of the teeth are alleged to facilitate chip removal, reduce resistance to rotation of the tool, provide for closer tolerances and to provide for operation at relatively lower speeds and temperatures thereby increasing the tool life and eliminating the necessity of reaming operations.

The drill bit of this invention is designed especially for drilling printed circuit boards to eliminate the problems heretofore encountered and specifically to provide burr free, smear free and stress free holes within allowable tolerances as to size, without need for cleaning processes and to improve the life and cutting characteristics of the drill. This is achieved herein by providing the conventional twist drill with auxiliary cutting edges which function primarily to remove the material generated by the cutting edges of the spiral grooves, the formation of which reduces the surface area of the drill bit in contact with the hole being generated thereby reducing the friction and enabling maintaining drill speed without overheating which is the primary cause of smearing and pitting and which places limitations on the speed of operation.

SUMMARY OF INVENTION

As herein illustrated, the twist drill of this invention comprises a drill bit having spirally arranged grooves and lands wherein the leading edges of the grooves are inclined to the axis of the drill bit and constitutes cutting edges and the lands rearwardly thereof with respect to the direction of rotation are relieved, characterized in that there are auxiliary rectilinearly arranged, longitudinally spaced cutting edges which intersect the inclined cutting edges and are parallel to the axis of the drill bit. These auxiliary cutting edges are spaced peripherally about the axis of the drill bit and are constituted by the leading sides of straight channels extending longitudinally of the drill bit which intersect the leading edges of the inclined grooves and the lands rearwardly thereof and are of lesser depth than the inclined grooves. The straight channels optionally may be of arcuate or rectangular cross section transversely of the axis of the bit. Alternatively, the auxiliary cutting edges may be in the form of truncated teeth on the surface of the lands, the tops of which are substantially flush with the cutting edges of the spiral grooves. Such truncated teeth may comprise knurling coextensive with the lands or confined to the shank.

The invention will now be described in greater detail with reference to the accompanying drawings wherein:

FIG. 1 is a fragmentary perspective of a drill bit supported and arranged to perform drilling operations in a printed circuit board;

FIG. 2 is an elevation broken away in part of the preferred form of drill bit made according to this invention;

FIG. 3 is an end view of the drill shown in FIG. 2 as seen from the point;

FIG. 4 is an elevation of a drill bit broken away in part showing an alternative form in which truncated teeth are formed on the lands;

FIG. 5 is a view corresponding to FIG. 4 with the truncated teeth confined to the shank, and FIG. 6 is an enlarged fragmentary elevation diagramatically showing the straight line arrangement of the flat tops of the teeth shown in FIGS. 4 and 5.

Drilling printed circuit boards entails many problems both with respect to the production of an acceptable circuit board and to the provision of a drill of the kind that can be used for any length of time efficiently. Primarily, the problems arise from the fact that the printed circuit boards are comprised of laminations of fiber glass, epoxy and copper which embody different physical characteristics. The epoxy smears on the surfaces of the holes generated and burrs are produced in the copper so that cleaning techniques such as etching and reaming operations are required which for their part cause additional difficulties and are time consuming, all of which adds to the cost of manufacture. As related above, the patents to Ostrom and Shaner attempted to solve some of these problems with special drill formations. The drill bit disclosed herein and as will now be described is considered to produce results far superior to that which can be obtained by the use of the drills shown in the aforesaid patents and to provide for longevity of the drill itself, which is of material consideration since these drills are made of high carbon alloys and are expensive.

Referring to the drawings, FIGS. 1, 2 and 3 for the preferred form, the drill comprises a bit 10 at one end of which there is a shank 12 and the other end a tip 14. The bit 10 contains spirally arranged grooves 16—16 and lands 18—18. The leading edges 20—20 of the grooves 16—16 are the cutting edges of the bit. The surfaces of the lands 18—18 rearwardly of these leading edges in the direction of rotation are backed off in accordance with conventional practice to reduce the friction between the surfaces of the lands and the hole being generated.

In accordance with the preferred form of the invention as herein illustrated there are provided four uniformly spaced, circumferentially disposed, longitudinally extending straight line channels 22 which extend from the shank at one end to the tip at the other end, parallel to the axis of the bit. The channels 22 may be of arcuate cross section as shown in FIG. 3 or rectangular cross section and intersect the sloping cutting edges 20—20 thereby providing auxiliary longitudinally spaced axially cutting edges 24 which are substantially parallel to the axis of the bit. The auxiliary cutting edges 24 are correspondingly parallel to the wall of the hole being generated by the bit and so function as do the cutting edges of a reaming tool to scrape the shavings from the wall of the hole being generated. The channels 22 extend from the cutting edges 24 through the lands providing cutting edges $24_a$ which are backed off from the cutting edges 24 by the amount that the lands themselves are backed off and provide avenues for the escape of debris from the inside surface of the hole. The presence of these channels 22 reduces the total surface in contact with the inner wall of the hole thereby reducing frictional heating and this in turn reduces expansion and torsion in the drill bit itself.

Instead of using channels 20 as shown in FIGS. 1 and 2, the surface of the lands 18 as shown in FIG. 4 may be embossed or otherwise impressed with a plurality of supplemental cutting edges 24$_b$ in the form of straight lines of truncated teeth 28, FIG. 6, parallel to the axis of the bit. These truncated teeth 28 may be formed by knurling and their ends terminated substantially in the same plane as the cutting edges 20.

Optionally, as shown in FIG. 5, this knurling may be omitted from the bit and applied to the shank.

In whichever form the drill is made it is apparent that it requires no special machining of the drill in forming the spiral grooves and lands. In the preferred form as shown in FIGS. 2 and 3 a very simple milling operation is all that is required to cut the straight line channels 22-22 parallel to the axis of the bit and at uniformly spaced intervals about the axis without modification of the drill in any respect. Two, four or more of such channels may be employed. In the forms shown in FIGS. 4 and 5 the knurling may be formed on the lands or on the shank with a conventional knurling tool, again without any modification in the structure of the drill itself.

It should be understood that the present disclosure is for the purpose of illustration only and includes all modifications or improvements which fall within the scope of the appended claims.

I claim:

1. A twist drill, comprising a rigid cylindrical body containing spirally thereof longitudinally extending grooves and lands, said lands having spaced parallel inclined leading and trailing edges in relation to the direction of rotation, the leading edges constituting the principal cutting edges of the drill, characterized in that there are spaced circumferentially of the body in the surfaces of the lands longitudinally extending channels parallel to the axis of the drill comprising axially spaced channel portions which are in communication at their ends with the grooves and which divide the lands into peripherally spaced sections each section having spaced parallel edges parallel to the axis of the drill such that the leading edges of the peripherally spaced sections of the lands in relation to the direction of rotation constitute secondary cutting edges.

2. A twist drill according to claim 1, wherein there are four channels spaced uniformly about the axis of the drill.

3. A twist drill according to claim 1, wherein the channels are arcuate in section transverse to the axis of the drill.

4. A twist drill according to claim 1, wherein the channels are rectangular in section transverse to the axis of the drill.

5. A twist drill according to claim 1, wherein the width of the grooves and lands at right angles to the inclination of the grooves and lands are substantially equal.

6. A twist drill according to claim 1, wherein the widths of the channels at right angles to the axis of the drill are narrower than the width of the grooves at right angles to the inclination of the grooves.

7. A twist drill according to claim 1, wherein the depths of the channels are less than the depths of the grooves.

8. A twist drill according to claim 1, wherein there are a plurality of channels spaced at equal distances from each other about the axis of the drill.

* * * * *